United States Patent
Jin et al.

(10) Patent No.: US 9,071,401 B2
(45) Date of Patent: Jun. 30, 2015

(54) PILOT-LESS NOISE ESTIMATION

(71) Applicant: Cisco Technology, Inc., San Jose, CA (US)

(72) Inventors: Hang Jin, Plano, TX (US); Koen Van Renterghem, Lovendegem (BE); Richard Meller, Sunnyvale, CA (US); Denis Downey, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 14/056,300

(22) Filed: Oct. 17, 2013

(65) Prior Publication Data

US 2015/0110227 A1 Apr. 23, 2015

(51) Int. Cl.
*H04L 1/00* (2006.01)
*H04L 1/20* (2006.01)

(52) U.S. Cl.
CPC .............. *H04L 1/0054* (2013.01); *H04L 1/20* (2013.01)

(58) Field of Classification Search
CPC ......... H04L 1/0054; H04L 1/20; H04L 1/005; H04L 1/0057; H04L 1/0059; H04L 1/0065; H04L 1/0071; H04L 25/0224; H04L 2025/03426; H04L 25/0226; H04L 25/0232; H04L 25/0242; H04L 27/0008; H04L 5/0007
See application file for complete search history.

(56) References Cited

U.S. PATENT DOCUMENTS

| | | | |
|---|---|---|---|
| 7,570,722 B1 | 8/2009 | Lee et al. | |
| 8,301,989 B1* | 10/2012 | Griniasty | 714/786 |
| 8,543,894 B1* | 9/2013 | Varnica et al. | 714/794 |
| 8,555,131 B2* | 10/2013 | Rault et al. | 714/752 |
| 2002/0172266 A1 | 11/2002 | Abraham et al. | |
| 2008/0239094 A1 | 10/2008 | Baqai et al. | |
| 2012/0093265 A1* | 4/2012 | Montekyo et al. | 375/340 |
| 2013/0051444 A1* | 2/2013 | Roh | 375/222 |
| 2014/0003560 A1* | 1/2014 | Kolze et al. | 375/346 |
| 2014/0082448 A1* | 3/2014 | Zhang et al. | 714/752 |
| 2014/0098912 A1* | 4/2014 | Yin et al. | 375/345 |
| 2014/0112077 A1* | 4/2014 | Ish-Shalom et al. | 365/185.18 |

* cited by examiner

*Primary Examiner* — Hirdepal Singh
(74) *Attorney, Agent, or Firm* — Edell, Shapiro & Finnan, LLC (57) ABSTRACT

Presented herein are pilot-less noise estimation techniques that utilize a correlation between attributes of a received signal and the noise to generate signal-to-noise ratio (SNR) estimate for the signal. More specifically, an interval of a digital signal is received a log-likelihood ratio (LLR) value is calculated for a plurality of bits in the interval of the signal. A scalar value that relates to a distribution of the calculated LLR values is computed. The SNR for the interval of the signal is determined based on a predetermined correlation between the scalar value and noise within the received interval of the signal.

20 Claims, 6 Drawing Sheets

PILOT-LESS NOISE ESTIMATION

TECHNICAL FIELD

The present disclosure relates to noise estimation in a communication channel.

BACKGROUND

Messages/data are transmitted from a transmitting device to a receiving device over a communication channel in which noise is inherently present. The transmission of messages over a so-called noisy communication channel often involves some type of forward error checking/correcting process in order to reduce or eliminate noise induced errors at the receiving device.

Low-density parity-check (LDPC) codes are examples of forward error correction (FEC) codes that may be used in a forward error checking/correcting process on a noisy channel. LDPC codes are defined by a sparse parity-check matrix (i.e., a matrix populated primarily with zeros). LDPC codes have been accepted for use in numerous communication standards (e.g., Wi-Fi™ and WiMAX™ standards, the Long Term Evolution (LTE) standard, the Digital Video Broadcasting 2nd Generation Cable Transmission standard (DVB-C2), and the Data Over Cable Service Interface Specification Version 3.1 (DOCSIS 3.1)).

DESCRIPTION OF EXAMPLE EMBODIMENTS

Overview

Presented herein are pilot-less noise estimation techniques that utilize a correlation between attributes of a received signal and noise to generate a signal-to-noise ratio (SNR) estimation for the signal. More specifically, an interval of a digital signal is received and a log-likelihood ratio (LLR) value is calculated for a plurality of bits in the interval of the signal. A scalar value that relates to a distribution of the calculated LLR values is computed. The SNR for the signal in the interval is determined based on a predetermined correlation between the scalar value and noise within the signal.

Example Embodiments

Noise estimation may be used in a large number of applications that involve the transmission of messages/data (e.g., video, audio, etc.) over a noisy channel. Merely for ease of illustration, the pilot-less noise estimation techniques presented herein will be described with reference to noise estimation in a Data Over Cable Service Interface Specification Version 3.1 (DOCSIS 3.1) system that uses Low-density parity-check (LDPC) codes. Also for ease of illustration, the pilot-less noise estimation techniques are primarily described with reference to an orthogonal frequency-division multiplexing (OFDM) system. It is to be appreciated that the pilot-less noise estimation techniques are not limited to OFDM systems, but rather are applicable to any system using LDPC forward error correction, such as a single-carrier Quadrature Amplitude Modulation (QAM) system. As such, the pilot-less noise estimation techniques should not be interpreted as implying or requiring an OFDM system.

Figure 1:
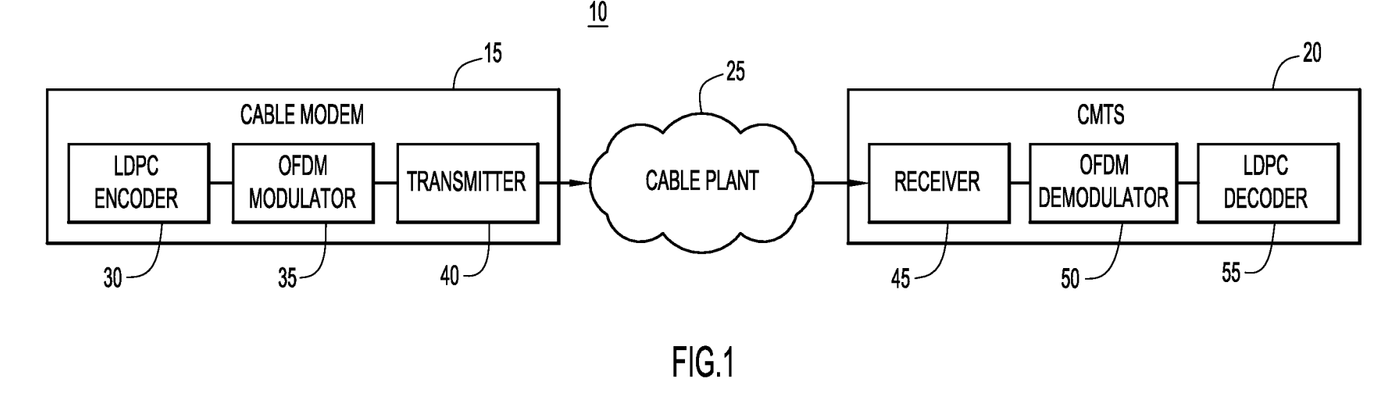
FIG. 1 is a block diagram of a cable network configured to implement pilot-less noise estimation techniques in accordance with examples presented herein.

It is known that a large number of personal/home users access the Internet through cable networks that utilize existing cable television infrastructure to transmit/receive Internet traffic. In a typical configuration, a personal computer is connected to the cable modem that interfaces with a coaxial, hybrid fiber/coaxial cable (HFC), or optical fiber cable (fiber-optic cable) forming part of a cable plant used to provide cable television service to the home, office, etc. FIG. 1 is a block diagram of an example DOCSIS 3.1 cable network 10 comprising a cable modem 15 connected to a cable modem termination system (CMTS) 20 via a cable plant 25 (e.g., cables and associated hardware).

In the cable network 10, digital data is transmitted between the cable modem 15, typically located at the user's home or office, and the CMTS 20, typically located at the head end of the network. The digital data is carried using radio frequency (RF) carrier signals. As such, the cable modem 15 includes an LDPC encoder 30, an OFDM multiplexing modulator 35, and a transmitter 40 (e.g., transmitter (Tx) front end circuitry). The LDPC encoder 30 is configured to generate an LDPC code word for transmission with digital data (messages) over the cable plant 25. The OFDM modulator 35 is configured to convert the digital data and LDPC codes into a modulated RF signal for upstream transmission to the CMTS 20 using the transmitter 40.

The CMTS 20 comprises a receiver 45 (e.g., receiver (Rx) front end circuitry), an OFDM demodulator 50, and an LDPC decoder 55. The receiver 45 receives the modulated signals from cable modem 15 and the OFDM demodulator 50 demodulates the received downstream RF signals. The LDPC decoder 55 is used with the OFDM demodulator 50 to reconstruct the original messages for transmission/forwarding to another node or entity. In the example of FIG. 1, the LDPC decoder 55 is configured to execute pilot-less noise estimation techniques presented herein for error checking/correcting of the received signals.

Figure 2:
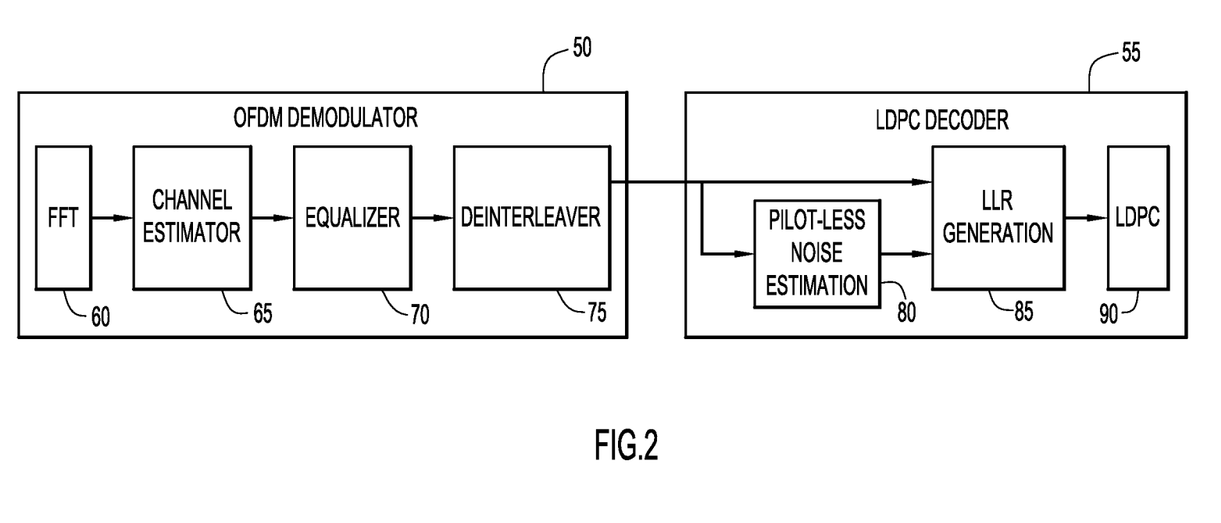
FIG. 2 is a block diagram of a demodulator and a LDPC decoder configured to implement pilot-less noise estimation techniques in accordance with examples presented herein.

FIG. 2 is a block diagram illustrating further details of the OFDM demodulator 50 and LDPC decoder 55. As shown, the OFDM demodulator 50 comprises a Fast Fourier Transform (FFT) module 60, a channel estimator 65, an equalizer 70, and a deinterleaver 75. The operations of FFT 60, channel estimator 65, equalizer 70, and deinterleaver 75 to demodulate received RF signals are known and are not described further herein.

The LDPC decoder 55 comprises a pilot-less noise estimation module 80, a log-likelihood ratio (LLR) generation module 85, and an LDPC module 90. In operation, the demodulated signals are provided to the pilot-less noise estimation module 80 and to the LLR generation module 85. As described further below, the pilot-less noise estimation module 80 generates noise estimate information that is used by the LLR generation module 85 to calculate LLRs for bits in the received signal. The LLRs generated by LLR generation module 85 are then used by the LDPC module 90 to decode the LDPC in the received signal.

In the example arrangement of FIG. 2, the deinterleaver 75 provides signals to the pilot-less noise estimation module 80 and to the LLR generation module 85. It is to be appreciated that other implementations are possible where, for example, the equalizer 70, rather than the deinterleaver 75, provides signals to the pilot-less noise estimation module 80 that are used for generation of the noise estimate information.

In order to decode an LDPC code, the LLRs for the bits within a received signal need to be determined. Equation 1, below, is an equation that may be used to calculate an LLR for a bit within a received signal.

$$LLR = \lambda^0(r; b_k = 0) - \lambda^1(r; b_k = 1) \quad \text{Equation 1:}$$

Where $\lambda^i(r, b_k = i)$ represents the probability that a bit $b_k = i$ (i=0, 1) with received signal (r) (in log scale) where k points to the $k^{th}$ bit in the symbol, and it is computed in accordance with Equation 2, below.

Equation 2:

$$\lambda^i(r, b_k = i) = \log \sum_{s \in S^i_{b_k}} Pr(r \mid s, h) \equiv \log \sum_{s \in S^i_{b_k}} \exp\left(-\frac{\|r - hs\|^2}{2\sigma^2}\right) \quad \text{Equation 2}$$

where h is the channel coefficient, s is a QAM constellation (e.g., binary phase-shift keying (BPSK), quadrature phase-shift keying (QPSK), n-QAM) point, $s_{b_k}^i$ is a collection of constellation points containing the value i at bit index k, and σ is the noise standard deviation.

Given the received signal r, the LDPC decoder 55 needs to determine h, s and σ for effective decoding. The value for h can be obtained/removed through the channel estimation, s is known for a given QAM order, and σ needs to be estimated.

In general, σ is the standard deviation of the noise embedded in the signal and can change from symbol to symbol. To simplify the LLR computation, certain conventional techniques assume that σ is a constant for an entire signal. In this way, these conventional techniques can remove a from the metric computation because all of the LLR values are weighted with the same constant, which can then be removed.

Although sub-optimal, a scheme that assumes a constant σ is sufficient if the noise level is substantially the same for all the symbols (e.g., additive white Gaussian noise (AWGN)). Unfortunately, this is not the case with DOCSIS upstream signals where the burst noise is intermittent and the noise level changes dramatically from symbol to symbol. If the same noise level (i.e., constant σ) is assumed for all the symbols in a DOCSIS signal, the LDPC decoding performance is poor.

One method for estimating the noise level of a signal is to compute the signal's modulation error ratio (MER), which is a measure of the signal-to-noise ratio (SNR) of the received signal. Conventional MER computations require reference points embedded in the received signal. That is, conventional MER computations are successful only if the bits carried by the received signals are known to a certain degree. These known signals are often referred to as "pilots" or "pilot signals." In practice, pilots exist only at very limited symbol points and, as such, there are insufficient pilots for noise estimations for all the symbols. As such, if the bits are unknown, the MER estimation operates blindly without knowing the actual or true reference points of the bits. In general, such blind MER estimation results in a significant under-estimation of the errors within the received signal. That is, without knowledge of the actual references points, the errors will be computed with the closest reference points on the constellation, resulting in under-estimated errors, particularly for signals that have low SNRs. As such, this conventional approach also does not work well for DOCSIS 3.1 since pilots are needed on all of the symbols (to avoid blind MER estimation), which would introduce high pilot overhead.

Obtaining an accurate noise level estimation is important for calculating σ values that may be used in the LDPC decoding operations to calculate LLRs. However, as noted above, conventional noise estimation techniques are not effective for various types of noise and/or require significant overhead. The pilot-less noise estimation techniques presented herein provide accurate noise estimation using normal data that may not include pilot signals. The pilot-less noise estimation techniques presented herein also may be applied to any type of noise and data. In general, the pilot-less noise estimation techniques provide a correlation between attributes of the received signal with received noise that may then be used to calculate σ values for use in LDPC decoding.

Figure 3A:
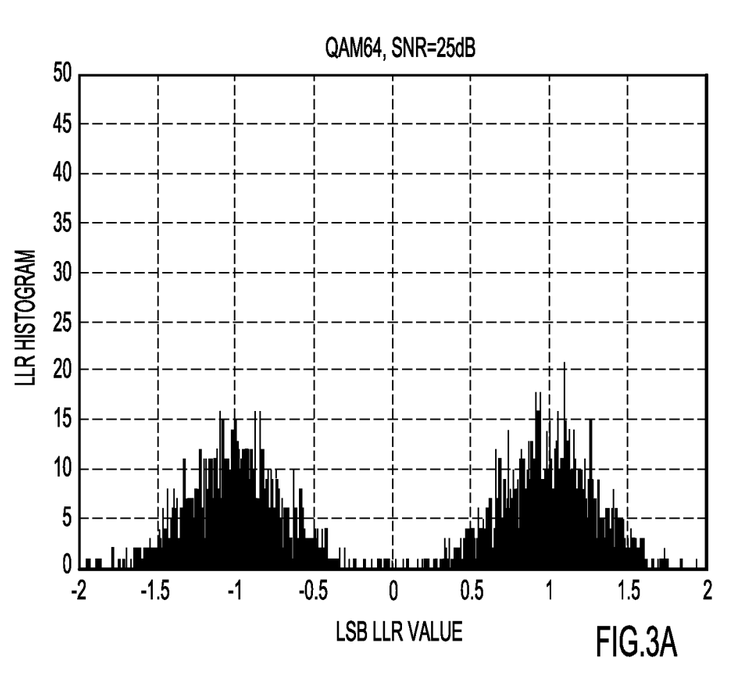
FIGS. 3A and 3B are histograms illustrating a correlation of noise to signal attributes in accordance with examples presented herein.
Figure 3B:
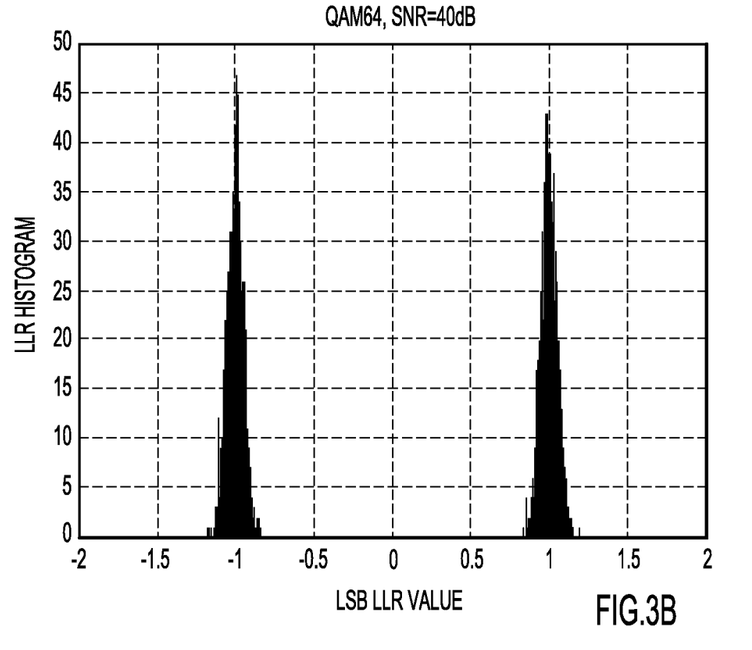

It has been discovered that when certain bits of symbols (e.g., the least significant bits (LSBs) and/or the second LSBs (LSB+1 s)) in a digital signal are mapped into a symbol constellation following the gray mapping scheme (gray code), the distribution of LLR values calculated from the bits will follow a bimodal shape as shown in FIGS. 3A and 3B. More specifically, FIGS. 3A and 3B are example histograms schematically illustrating the correlation of LSB LLR values (i.e., LLR values calculated from the LSBs) for various SNRs. FIG. 3A illustrates a situation where the SNR in a received 64 QAM (QAM64) signal is relatively low (i.e., 25 decibels (dB)) and the LSB LLR distribution is relatively widespread. Conversely, FIG. 3B illustrates a situation where the SNR in a received 64 QAM signal is relatively high (i.e., 40 dB) and the LSB LLR distribution is relatively narrow. Mathematically, the distribution or spreading can be quantitatively expressed with its standard deviation; wide spreading has a larger standard deviation and narrow spreading has a less standard deviation. As such, the standard deviation of the LSB LLRs, referred to herein as $\sigma_L$, is inversely proportional to the signal SNR, as illustrated by FIG. 3A and FIG. 3B.

The techniques presented herein are primarily described with reference to the use of LSBs to calculate a $\sigma_L$ for use in determining a signal SNR (as illustrated by FIG. 3A and FIG. 3B). However, it is to be appreciated that reference to LSBs is merely for ease of illustration and that the techniques may also be used with other bits of received symbols, such as the second least significant bits (LSB+1 s). The techniques can also be modified to operate by combining the standard deviations of the LSBs and LSB+1 s to determine $\sigma_L$. That is, an LLR value may be calculated for either the least significant bit or the second least significant bit of the symbols, or for both the least significant bit and the second least significant bit of the symbols.

Figure 4:
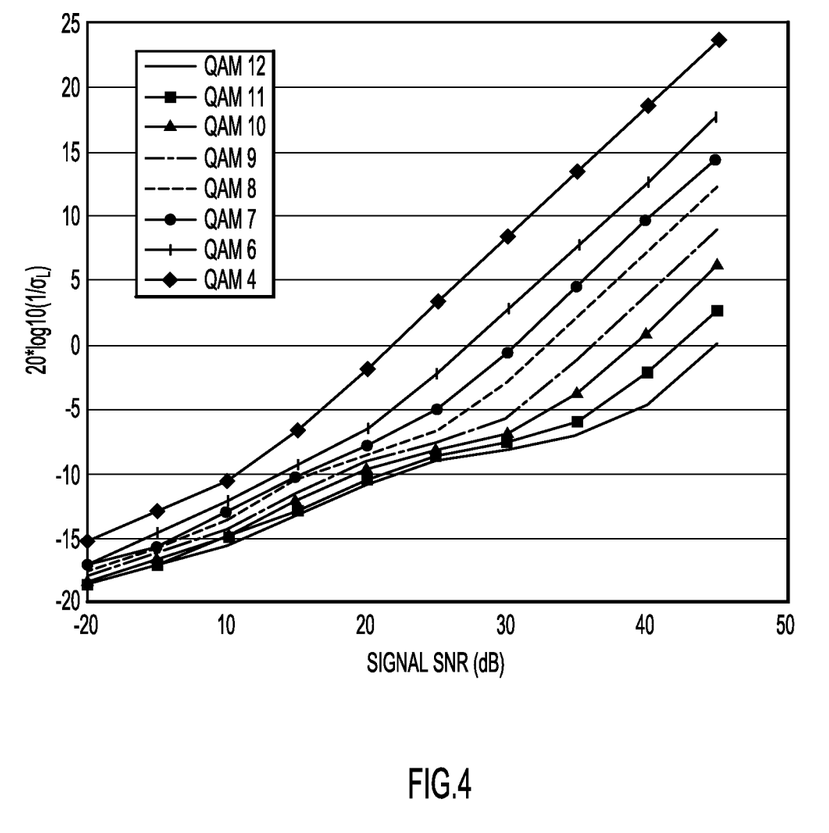
FIG. 4 is a graph illustrating a calculated standard deviation value as a function of the noise in a signal.

FIG. 4 is a graph illustrating $\sigma_L$ as a function of SNR for given QAM orders. In addition to the inverse relationship of $\sigma_L$ to signal SNR, it has also been discovered that the relationship of $\sigma_L$ with the signal SNR is consistent and repetitive given the QAM order. These relational properties between $\sigma_L$ and signal SNR provide the basis for a lookup table of $\sigma_L$ values versus signal SNR. As described further below, the techniques presented herein calculate a $\sigma_L$ that may be used as an index into a lookup table to identify the SNR in a time and/or frequency interval of a signal. Using the SNR, an actual σ value for the interval may be calculated for use in calculating LLR values during LDPC decoding of one or more symbols in the interval. In general, an actual σ value is computed using a group of symbols that that obtained σ value is used to compute the LLR values for those symbols.

A lookup table of $\sigma_L$ values versus the signal SNR may be generated using a number of different approaches. In one example, the relationship between actual $\sigma_L$ values and actual signal SNRs are established through simulations. More specifically, a certain SNR and QAM order may be set and simulations are conducted to collect a plurality of LLR values. A value for $\sigma_L$ can then be calculated from the collected LLR values. This process may be repeated for various SNRs and QAM orders to obtain a complete lookup table.

In another example, the relationship between actual $\sigma_L$ values and actual signal SNRs can be obtained through factory calibration of a device configured to perform the operations described herein. In an example factory calibration approach, the SNR and QAM order of an input signal are set to a certain value and processed (decoded) as described below using an initial standard lookup table. The estimated SNR values are then collected at the output of the device. The values in the initial lookup table may then be adjusted until the estimated SNRs match the set SNRs.

Figure 5:
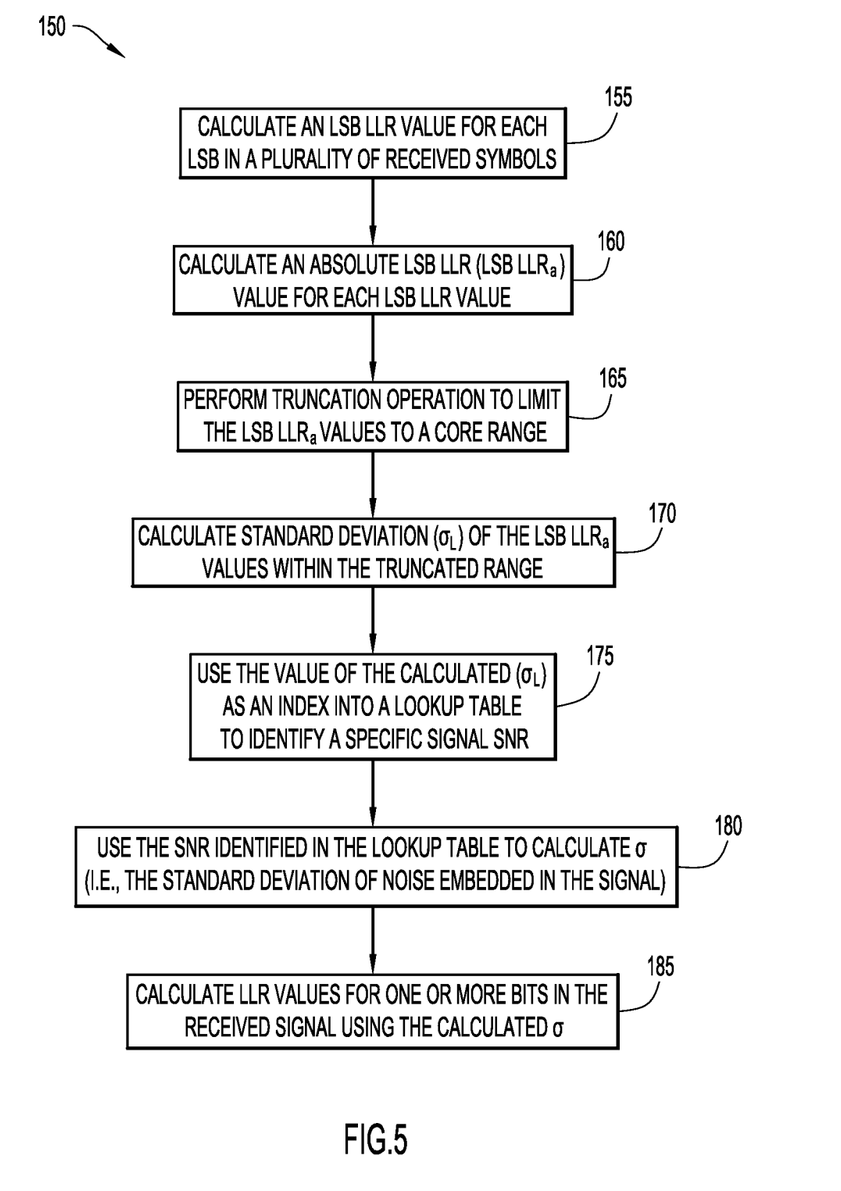
FIG. 5 is a detailed flowchart illustrating one example method in accordance with examples presented herein.

FIG. 5 is a detailed flowchart of a pilot-less noise estimation method 150 in accordance with embodiments presented herein. Method 150 begins at 155 where an LLR value is calculated for the LSB of each of a plurality of symbols in a received time and/or frequency interval. The LLR values calculated based on LSBs are sometimes referred to herein as LSB LLRs or LSB LLR values. As noted above, the use of LSBs is merely illustrative and other bits in a received symbol (e.g., LSB+1 s) may also or alternatively be used in other examples.

As noted above, LLR calculations rely upon σ, which is the standard deviation of the noise embedded in the signal. The value of σ is unknown and an objective of the techniques presented herein is to provide a mechanism for effectively estimating σ for use in calculating LLR values in accordance Equations 1 and 2, above. Since σ is unknown, during calculation of the LSB LLRs, σ is simply assigned a value of "1." That is, the LSB LLRs are calculated in accordance with Equations 1 and 2, above, where σ is assigned the value of 1.

At 160, an absolute LSB LLR, referred to herein as an LSB $LLR_a$ value or an LSB $LLR_a$, may be optionally calculated for each LSB LLR (i.e., all negative values may be flipped to positive values). In certain circumstances, LSB $LLR_a$ values may exist that have the potential to skew the results of the noise estimation. Therefore, at 165, a truncation operation is performed to limit the LSB $LLR_a$ values to a core range from which the possibly skewing LSB $LLR_a$ values have been substantially removed, thereby providing a range that better reflects the actual reliabilities of the received bits. In certain embodiments, the truncated range (TR) is defined below as shown in Equation 3.

$$TR = N \times D^2 \quad \text{Equation 3:}$$

where N is a numerical value selected based on the QAM order of the signal and D is the spacing between adjacent points in the corresponding QAM constellation.

The truncation operations described above are illustrative and other truncation methods may be used in alternative examples. For example, a truncation/saturation may be performed on the received symbols (i.e., before LLR calculation) within a certain range. This can be saturation on the I and Q values when the received symbol is in Cartesian notation or this can be saturation on the magnitude when the received symbol is in Polar notation (e.g., saturate the magnitude, but keep the angle). In such examples, the LSB $LLR_a$ values are calculated for only the symbols with the truncated range of received symbols to yield a truncated range of LSB $LLR_a$ values At 170, the $\sigma_L$ (standard deviation) of the LSB $LLR_a$ values within the truncated range is calculated. At 175, the value of the calculated $\sigma_L$ is used as an index into a lookup table to identify or point to a specific signal SNR. At 180, the SNR identified in the lookup table may then be used to calculate σ (i.e., the standard deviation of noise embedded in the signal). At 185, the σ so calculated may then be used in the process to compute LLRs for one more bits within the received signal during LDPC decoding.

It is to be appreciated the order of operations shown in FIG. 5 is merely illustrative. In certain examples, the various operations may be performed in a different order than as described above.

In summary of FIG. 5, a time and/or frequency interval of a digital signal is received at a receiving device in a network. An LLR value is calculated for a plurality of bits in the interval of the digital signal. In certain examples, the received interval of the digital signal comprises a plurality of digital symbols each having an LSB. In certain examples, an LLR value is calculated for each of the LSBs of the digital symbols. In other examples, an LLR value is calculated for each of the LSB+1 s, or the LSBs and the LSB+1 s of the symbols.

Furthermore, a scalar value (e.g., standard deviation) that relates to a distribution of the calculated LLR values is calculated. An SNR for the interval of the signal is determined based on a predetermined correlation between the scalar value and the received noise. The predetermined correlation may be, for example, a pre-stored lookup table, a mathematical formula, etc.

As noted above, σ may change from symbol to symbol or from group of symbols to group of symbols. As such, an actual σ value calculated using the method of FIG. 5 may only be accurate for a present symbol or group of symbols within a time and/or frequency interval. Therefore, the method of FIG. 5 may be repeated using different time and/or frequency intervals that include different groups of symbols to generate a revised or updated σ value for use in the LDPC decoding.

As noted, the group of symbols that are evaluated to determine a σ value may be within a time interval and/or a frequency interval. For example, in the context of a frequency interval, the signal may occupy some bandwidth (e.g., a total 20 megahertz (MHz) bandwidth). This bandwidth may be divided into frequency intervals (e.g., two 10 MHz intervals) and a σ value may be calculated for the symbols in each frequency interval. This may be particularly applicable to an OFDM system where the spectrum is divided into many narrow subcarriers.

Figure 6:
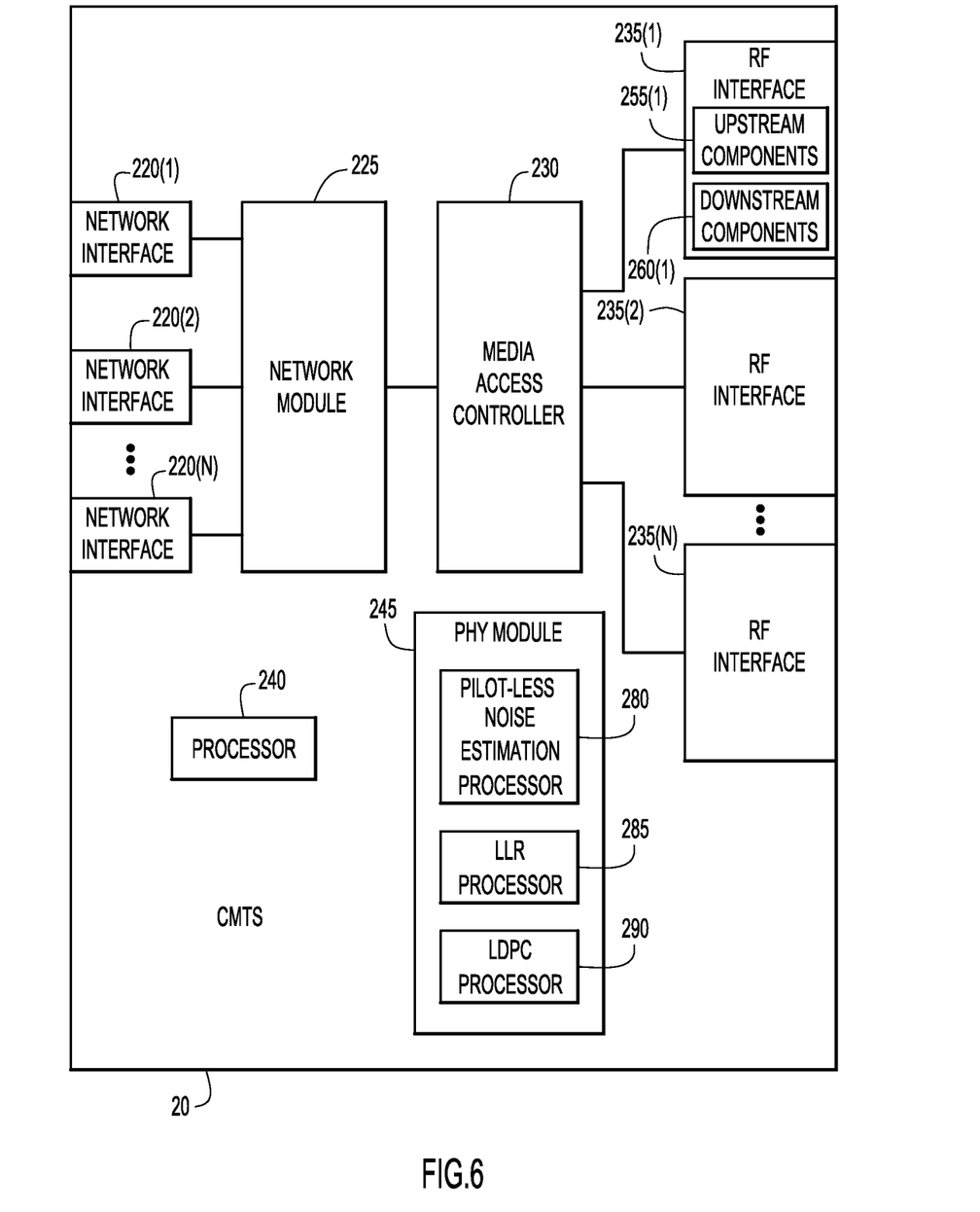
FIG. 6 is a block diagram of a cable modem termination system configured to implement pilot-less noise estimation techniques in accordance with examples presented herein.

FIG. 6 is a block diagram of one example configuration of CMTS 20 of FIG. 1. As shown, CMTS 20 comprises a plurality of network interfaces 220(1)-220(N), a network module 225, a media access controller (MAC) 230, a plurality of radio-frequency (RF) interfaces 235(1)-235(N), a processor 240, and a memory 245.

Generally, network module 225 interfaces with MAC 230 to transmit information between the two modules. Processor 240 is generally configured to manage bandwidth processing, and is in communication with both MAC 230 and network module 225 via, for example, a Peripheral Component Interconnect (PCI) bus (not shown in FIG. 6).

MAC 230 comprises hardware, software, or a combination thereof and is configured to interface with the plurality of RF interfaces 235(1)-235(N) to transmit RF signals to, or receive RF signals from, one or more cable modems (e.g., cable modem 15 in FIG. 1). RF interfaces 235(1)-235(N) are upstream/downstream physical layer interfaces (PHYs) each configured for connection to a coaxial cable. More specifically, RF interfaces 235(1)-235(N) include upstream PHY components 255(1)-255(N) and downstream PHY components 260(1)-260(N), which collectively operate to interface with RF circuitry. For ease of illustration, only the details of RF interface 235(1) are shown in FIG. 6 and, as such, only RF interface 235(1) is described in detail.

The upstream PHY components 255(1) operate to receive RF signals from a cable modem, and as such, the upstream PHY components 255(1) operate as a demodulator. As such, the functionality of receiver 45 (FIG. 1) and OFDM demodulator 50 (FIG. 1) may be provided by the upstream PHY components. The downstream PHY components 260(1) operate to transmit RF signals to a cable modem, and, because the signals on a coaxial cable are modulated signals (e.g., RF signals), the downstream PHY components 260(1) operate as a modulator.

MAC 230 operates to prepare packets for transmission to cable modems and to prepare packets received from the cable modems for use by network module 225. The packet preparation may include, for example, encryption, decryption, suppression, expansion, concatenation, fragmentation, multiplexing, demultiplexing, etc., depending on the desired configuration of the CMTS 20 and the related components.

Network interfaces 220(1)-220(N) connect CMTS 20 with an external network (e.g., a wide area network (WAN), a local area network (LAN), etc.) Network module 225 receives packets from MAC 230, and prepares the packets for forwarding to the network via interfaces 220(1)-220(N). Similarly, network module 225 receives packets from the network (via interfaces 220(1)-220(N)) and prepares these received packets for use by MAC 230. The packet preparation by network module 225 may include, for example, rate shaping, bandwidth limiting, priority queuing, etc., depending on the desired configuration of CMTS 20 and the related components. Processor 240 generally operates to manage system issues of CMTS 20, and in this particular example, all DOCSIS system issues such as scheduling, provisioning, accounting, configuring, etc.

As noted above with reference to FIG. 1, CMTS 20 is further configured to execute LDPC decoding of signals received from a cable modem (i.e., LDPC decoder 55). The operations of LDPC decoder 55 are implemented as part of PHY module 245 that comprises pilot-less noise estimation processor 280, LLR processor 285, and LDPC processor 290. In the embodiment of FIG. 6, the noise estimation processor 280, LLR processor 285, and LDPC processor 290 are all physical processing elements (e.g., digital logic gates in one or more application-specific integrated circuits (ASICS)) operable to perform the pilot-less noise estimation, LLR generation, and other LDPC decoding operations described herein.

In certain embodiments, the PHY module 245 may be connected between the RF interfaces 235(1)-235(n) and the MAC 230 to receive demodulated signals or may be part of the upstream components 255(1). However, merely for ease of illustration, PHY module 245 is shown in FIG. 6 as separate element. It is also to be appreciated that the implementation of FIG. 6 is merely illustrative and that other implementations are possible.

While the techniques illustrated and described herein are embodied in one or more specific examples, it is nevertheless not intended to be limited to the details shown, since various modifications and structural changes may be made therein without departing from the scope and range of equivalents of the claims.

What is claimed is:

1. A method comprising:
   receiving a digital signal comprising a plurality of symbols transmitted over a communication channel, wherein the plurality of symbols each have a least significant bit and a second least significant bit;
   calculating a log-likelihood ratio (LLR) value for a plurality of bits within an interval of the signal by calculating an LLR value for either the least significant bit or the second least significant bit of each of a plurality of symbols in an interval, or for both the least significant bit and the second least significant bit of the plurality of symbols in the interval;
   computing a scalar value that relates to a statistical distribution of the calculated LLR values; and
   determining a signal-to-noise ratio (SNR) for the interval of the signal based on a predetermined correlation between the scalar value and noise within the interval of the signal.

2. The method of claim 1, wherein the interval is a time interval.

3. The method of claim 1, wherein the interval is a frequency interval.

4. The method of claim 1, further comprising:
   calculating, based on the SNR determined for the interval of the signal, a standard deviation of the noise embedded in the interval of the signal.

5. The method of claim 4, further comprising:
   decoding Low-Density Parity-Check codes in the interval of the signal using the standard deviation of the noise embedded in the interval of the signal.

6. The method of claim 1, wherein computing a scalar value that relates to a statistical distribution of the calculated LLR values comprises:
   calculating a standard deviation of the calculated LLR values.

7. The method of claim 6, wherein determining the SNR for the interval of the signal based on a predetermined correlation comprises:
   using the standard deviation of the LLR values as an index into a stored lookup table that correlates the noise within the received interval of the signal to the standard deviation of the calculated LLR values.

8. The method of claim 1, further comprising:
   repeating, for each of a plurality of intervals, the calculating an LLR value for a plurality of bits in a interval, the computing a scalar value that relates to a statistical distribution of the calculated LLR values in the interval, and the determining an SNR.

9. An apparatus comprising:
   an interface unit configured to receive a digital signal comprising a plurality of symbols transmitted over a communication channel, wherein the plurality of symbols each have a least significant bit and a second least significant bit; and
   a processor coupled to the interface unit, and configured to:
      calculate a log-likelihood ratio (LLR) value for a plurality of bits within an interval of the signal by calculating an LLR value for either the least significant bit or the second least significant bit of each of a plurality of symbols in an interval, or for both the least significant bit and the second least significant bit of the plurality of symbols in the interval,
      compute a scalar value that relates to a statistical distribution of the calculated LLR values, and determine a signal-to-noise ratio (SNR) for the interval of the signal based on a predetermined correlation between the scalar value and noise within the interval of the signal.

10. The apparatus of claim 9, wherein the processor is configured to:
calculate, based on the SNR determined for the interval of the signal, a standard deviation of the noise embedded in the interval of the signal.

11. The apparatus of claim 10, further comprising:
a Low-Density Parity-Check processor configured to decode LDPC codes in the interval of the signal using the standard deviation of the noise embedded in the interval of the signal.

12. The apparatus of claim 9, wherein the processor is configured to:
calculate a standard deviation of the calculated LLR values; and
use the standard deviation of the LLR values as an index into a stored lookup table to correlate the noise within the received interval of the signal to the standard deviation of the calculated LLR values.

13. The apparatus of claim 9, wherein the processor is configured to:
repeat, for each of a plurality of intervals, the calculation of an LLR value for a plurality of bits in an interval, the computation a scalar value that relates to a statistical distribution of the calculated LLR values in the interval, and the determination of an SNR.

14. The apparatus of claim 9, wherein the interval is a time interval.

15. The apparatus of claim 9, wherein the interval is a frequency interval.

16. An apparatus comprising:
a receiver configured to receive a digital signal comprising a plurality of symbols transmitted over a communication channel, wherein the plurality of symbols each have a least significant bit and a second least significant bit; and
a Low-Density Parity-Check (LDPC) decoder configured to:
calculate a log-likelihood ratio (LLR) value for a plurality of bits within an interval of the signal by calculating an LLR value for either the least significant bit or the second least significant bit of each of a plurality of symbols in an interval, or for both the least significant bit and the second least significant bit of the plurality of symbols in the interval;
calculate a standard deviation of the LLR values, wherein the standard deviation relates to a statistical distribution of the calculated LLR values; and
determine a signal-to-noise ratio (SNR) for the interval of the signal based on a predetermined correlation between the standard deviation and noise within the interval of the signal.

17. The apparatus of claim 16, wherein LDPC decoder is configured to:
calculate, based on the SNR determined for the interval of the signal, a standard deviation of the noise embedded in the interval of the signal.

18. The apparatus of claim 17, wherein the LDPC decoder is further configured to:
decode LDPC codes in the interval of the signal using the standard deviation of the noise embedded in the interval of the signal.

19. The apparatus of claim 16, wherein the LDPC decoder is configured to:
calculate a standard deviation of the calculated LLR values; and
use the standard deviation of the LLR values as an index into a lookup table to correlate the noise within the received interval of the signal to the standard deviation of the calculated LLR values.

20. The apparatus of claim 16, wherein the LDPC decoder is configured to:
repeat, for each of a plurality of intervals, the calculation of an LLR value for a plurality of bits in an interval, the computation a scalar value that relates to a statistical distribution of the calculated LLR values in the interval, and the determination of an SNR.

* * * * *